United States Patent [19]

Stasyshyn

[11] Patent Number: 5,196,677
[45] Date of Patent: Mar. 23, 1993

[54] IN A COFFEE POT APPARATUS

[76] Inventor: John G. Stasyshyn, R.R. 1, Box 1137, Bangor, Pa. 18013

[21] Appl. No.: 797,417

[22] Filed: Nov. 21, 1991

[51] Int. Cl.[5] .............................................. H05B 3/72
[52] U.S. Cl. .................................... 219/433; 219/430; 219/432; 219/506
[58] Field of Search ............... 219/433, 499, 459, 430, 219/432, 429, 456, 441, 442, 506; 126/214 D, 221, 390, 214 C, 220

[56] References Cited

U.S. PATENT DOCUMENTS

| D. 97,336 | 10/1935 | Richheimer | 126/214 C |
|---|---|---|---|
| 2,213,378 | 9/1940 | Benesh | 126/390 |
| 4,170,931 | 10/1979 | Fajans | 219/433 |
| 4,798,937 | 1/1989 | Guerrero | 219/433 |
| 4,825,046 | 4/1989 | Box | 219/433 |
| 4,896,022 | 1/1990 | Schroeder | 219/433 |
| 4,994,649 | 2/1991 | Roland | 219/433 |

Primary Examiner—Teresa J. Walberg
Attorney, Agent, or Firm—Leon Gilden

[57] ABSTRACT

An apparatus arranged in combination with a coffee pot structure to provide for a spacer disc to space a coffee pot relative to an associated burner unit to minimize undue heating and moderate associated over-heating of a coffee pot structure. Further, the spacer unit is arranged with various lifting and adjustment structure, as well as an alarm apparatus to signal the relative quantity of fluid contained within an associated coffee pot structure.

4 Claims, 4 Drawing Sheets

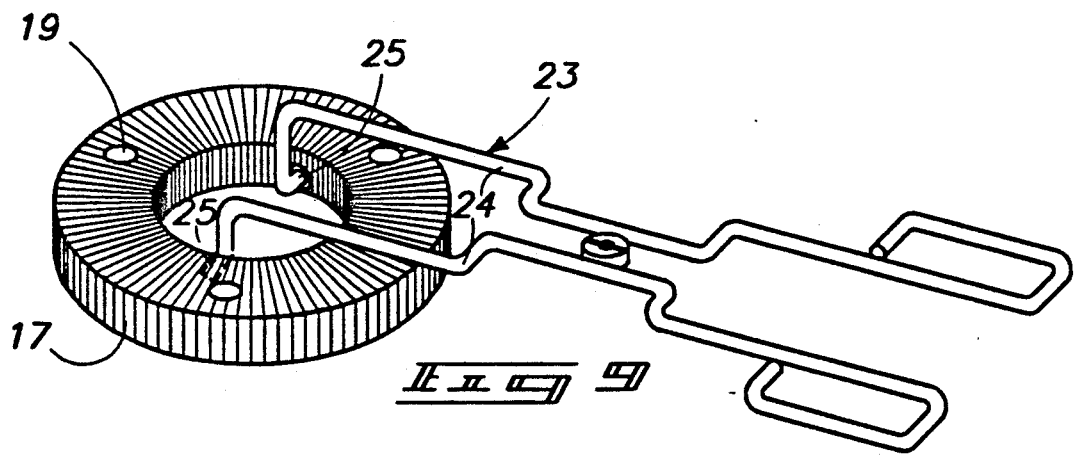
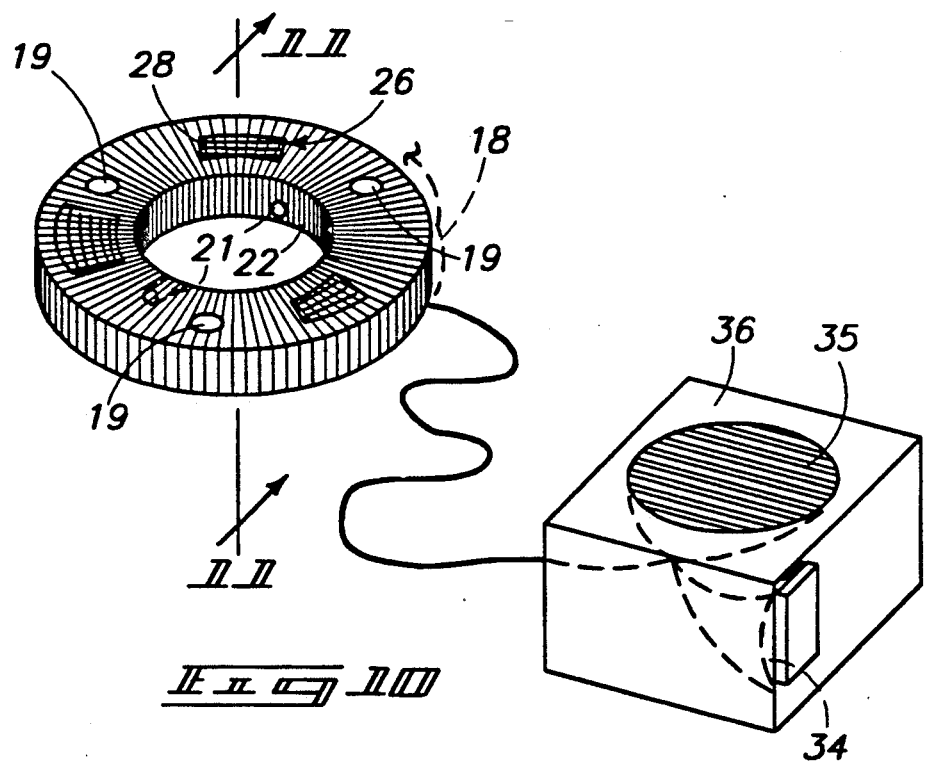
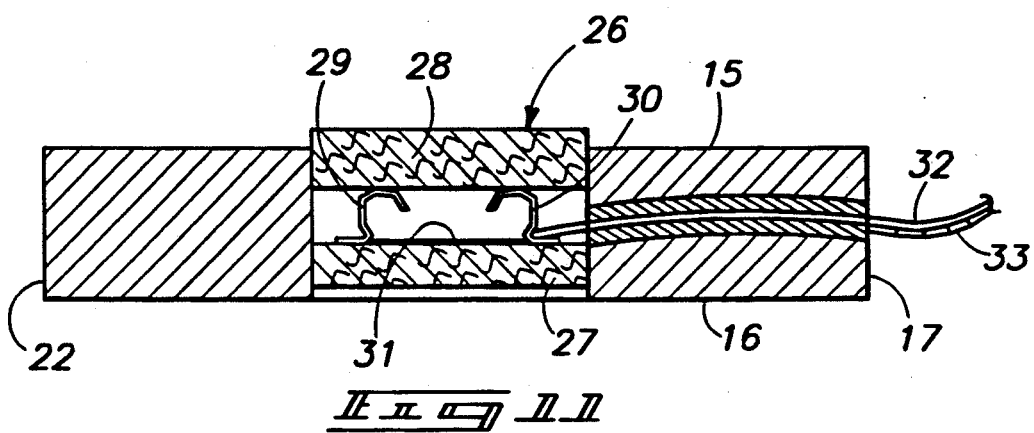

IN A COFFEE POT APPARATUS

BACKGROUND OF THE INVENTION

1. Field of the Invention

The field of invention relates to coffee pot apparatus, and more particularly pertains to a new and improved coffee pot apparatus wherein the same is arranged to minimize localized heating of coffee within a coffee pot structure.

2. Description of the Prior Art

In the direct application of heat to an associated coffee pot structure, burning of the pot or excessive boiling of coffee to produce a thickened coffee product due to an absence of water are problems associated with conventional coffee pot structure and their heating or burner surfaces. The instant invention attempts to overcome deficiencies of the prior art by providing a spacer disc formed with an air gap between the coffee pot and burner surface to minimize localized heating of the coffee pot. Prior art hot plate structure is exemplified in U.S. Pat. No. 4,962,297 to Lowenberg setting forth various temperature control heating surfaces.

U.S. Pat. No. 4,931,608 to Bills sets forth a further example of a hot pad for observing energy in a microwave oven and heating articles at thermally conductive contact with the pad.

As such, it may be appreciated that there continues to be a need for a new and improved coffee pot apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of coffee pot apparatus now present in the prior art, the present invention provides a coffee pot apparatus wherein the same utilizes a spacer disc to provide for an air gap relative to an associated burner surface and a coffee pot. As such, the general purpose of the present invention, which will be described subsequently in greater detail, is to provide a new and improved coffee pot apparatus which has all the advantages of the prior art coffee pot apparatus and none of the disadvantages.

To attain this, the present invention provides an apparatus arranged in combination with a coffee pot structure to provide for a spacer disc to space a coffee pot relative to an associated burner unit to minimize undue heating and moderate associated over-heating of a coffee pot structure. Further, the spacer unit is arranged with various lifting and adjustment structure, as well as an alarm apparatus to signal the relative quantity of fluid contained within an associated coffee pot structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved coffee pot apparatus which has all the advantages of the prior art coffee pot apparatus and none of the disadvantages.

It is another object of the present invention to provide a new and improved coffee pot apparatus which may be easily and efficiently manufactured and marketed.

It is a further object of the present invention to provide a new and improved coffee pot apparatus which is of a durable and reliable construction.

An even further object of the present invention is to provide a new and improved coffee pot apparatus which is susceptible of a low cost of manufacture with regard to both materials and labor, and which accordingly is then susceptible of low prices of sale to the consuming public, thereby making such coffee pot apparatus economically available to the buying public.

Still yet another object of the present invention is to provide a new and improved coffee pot apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 9 is an isometric illustration of the spacer disc utilizing receiving bores for accommodating removal tongs to permit manipulation of the spacer disc.

FIG. 10 is an isometric illustration of a further modified spacer disc utilizing an alarm mechanism for indicating absence of a coffee pot or alternatively fluid beverage contained within the associated coffee pot.

FIG. 11 is an orthographic view, taken along the lines 11—11 of FIG. 10 in the direction indicated by the arrows.

DESCRIPTION OF THE PREFERRED EMBODIMENT

Figure 1:
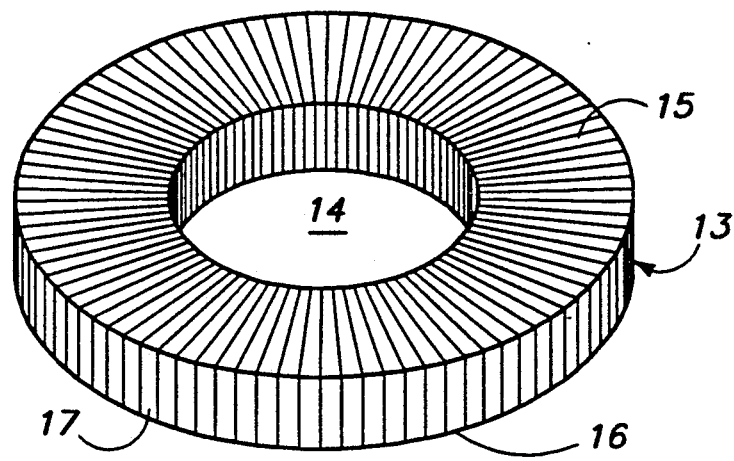
FIG. 1 is an isometric illustration of the spacer disc utilized by the invention.
Figure 2:
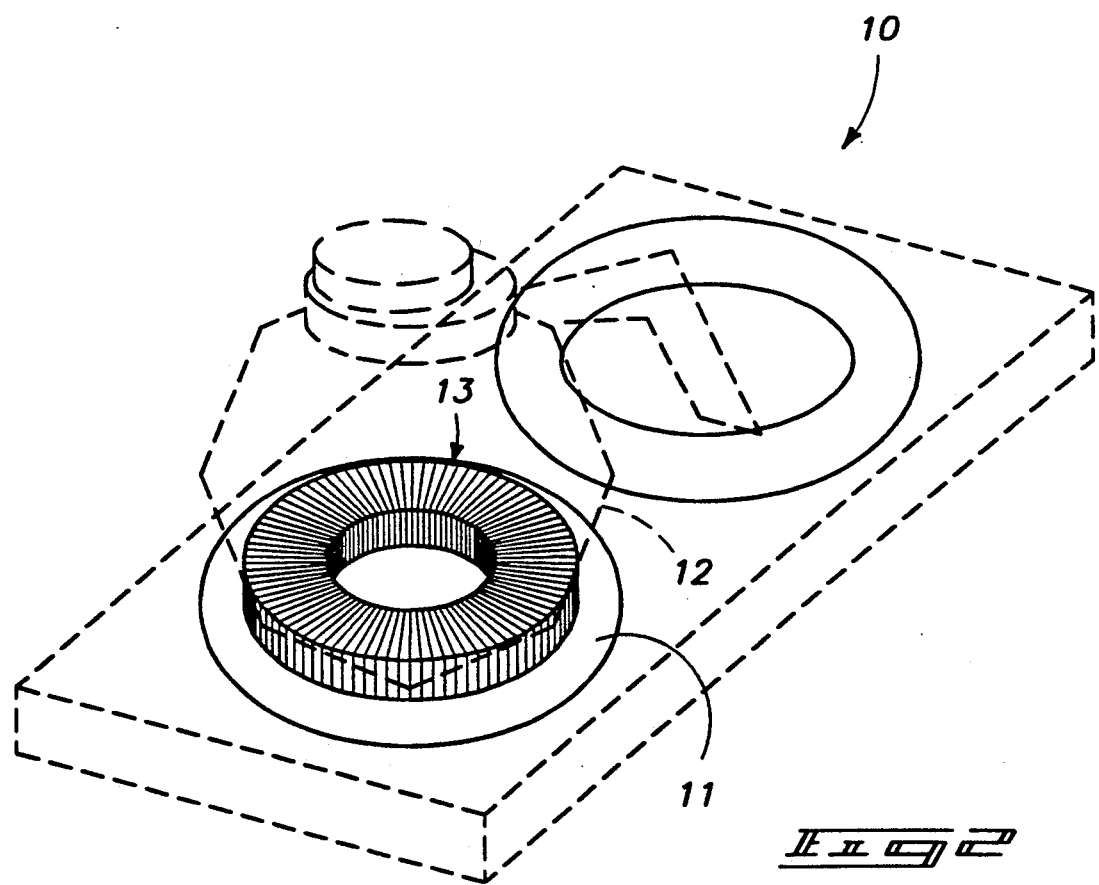
FIG. 2 is an isometric illustration of the invention in use.
Figures 3, 4:
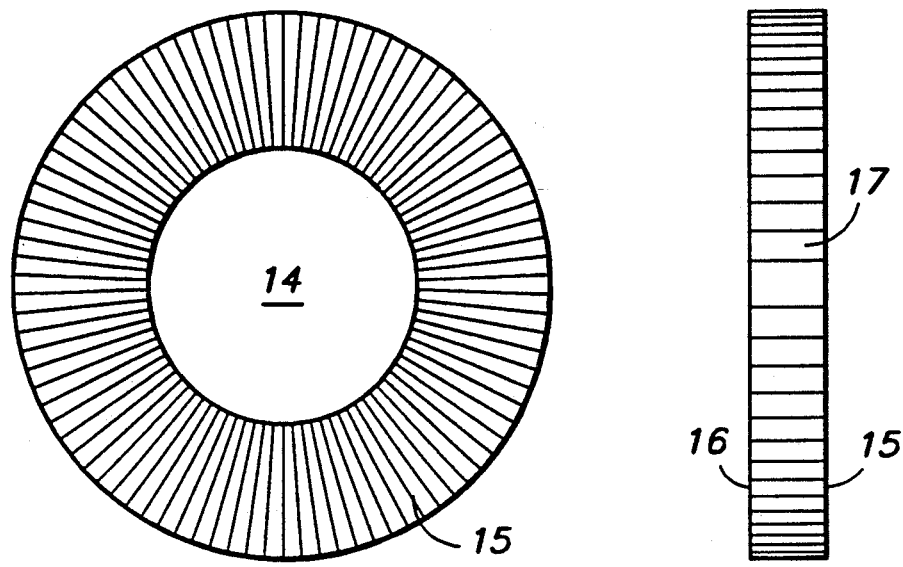
FIG. 3 is an orthographic top view of the spacer disc.
FIG. 4 is an orthographic side view of the spacer disc.

With reference now to the drawings, and in particular to FIGS. 1 to 11 thereof, a new and improved coffee pot apparatus embodying the principles and concepts of the present invention and generally designated by the reference numeral 10 will be described.

Figure 5:
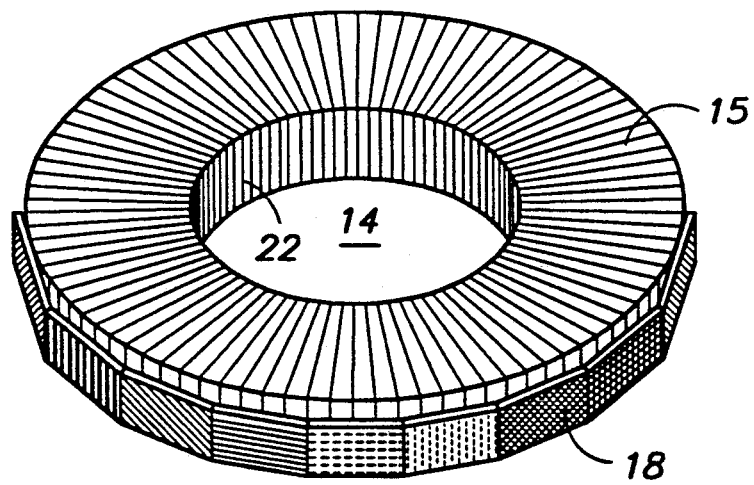
FIG. 5 is an isometric illustration of the spacer disc utilizing a temperature sensitive indicator strip formed to an interior surface thereof.

More specifically, the coffee pot apparatus 10 of the instant invention essentially comprises a heating surface 11 mounted relative to and below a coffee pot container 12 for heating of coffee and the like therewithin. A torroidal spacer disc 13 is arranged for positioning between the coffee pot container 12 and the heating surface 11 to provide for an air gap exteriorly of the torroidal disc 13 and is defined by a disc diameter less than a predetermined diameter of the coffee pot container 12. Further, the torroidal disc includes a cylindrical central opening 14 and wherein the disc is further defined by a planar top wall 15 spaced from a planar bottom wall 16, including a cylindrical side wall 17. The disc structure of FIG. 5 illustrates the use of a temperature sensitive indicator strip 18 mounted to an exterior surface, and more specifically the cylindrical side wall 17 for visual indication of temperature directed to the coffee pot container 12.

Figure 6:
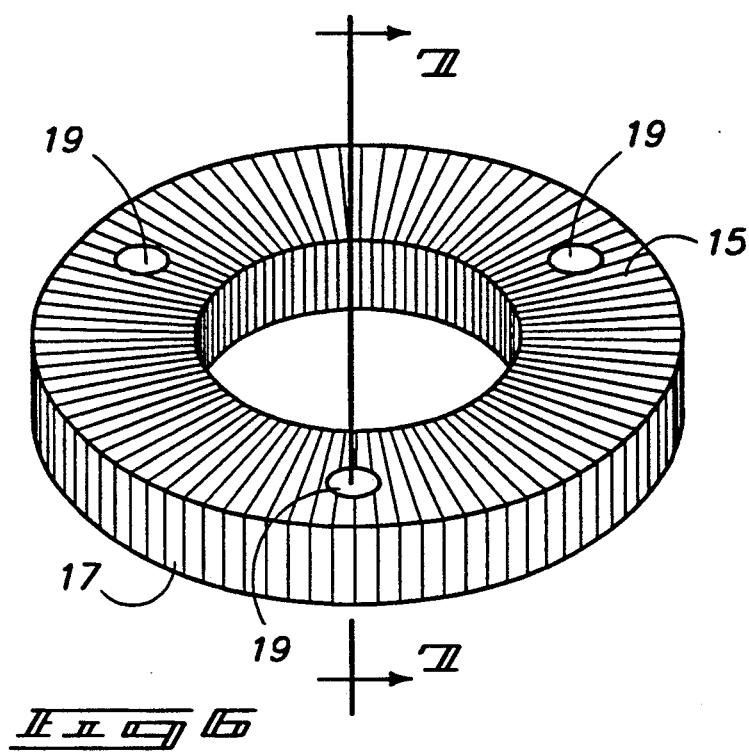
FIG. 6 is an isometric illustration of the spacer disc utilizing adjuster legs.
Figure 8:
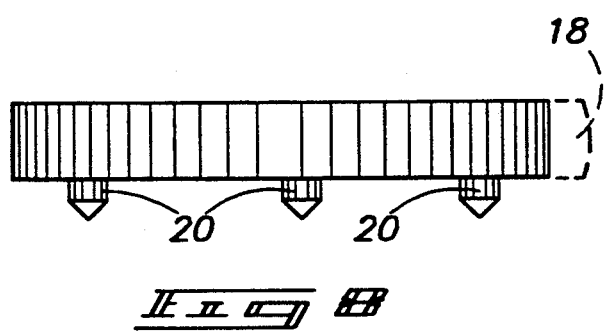
FIG. 8 is an orthographic end view of the spacer disc structure, as set forth in FIG. 6.
Figure 7:
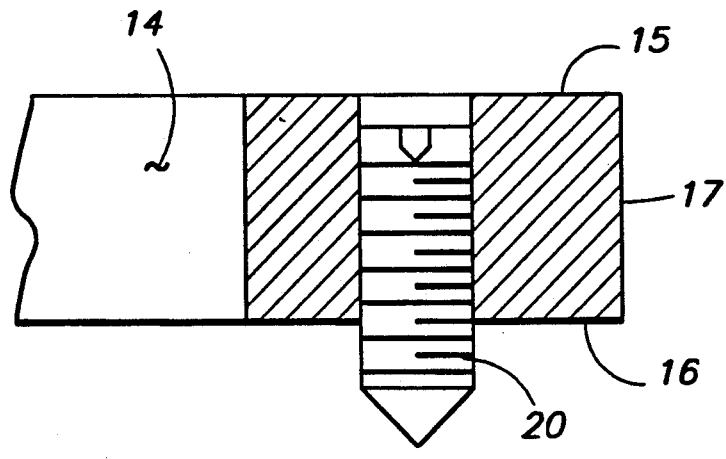
FIG. 7 is an orthographic view, taken along the lines 7—7 of FIG. 6 in the direction indicated by the arrows.

The disc structure, as illustrated in the FIGS. 6-8, illustrate a plurality of internally threaded bores 19 orthogonally directed through the top and bottom walls 15 and 16 arranged in a single circular array coincident with an axis defined by the disc 13. Each internally threaded bore includes an externally threaded leg member 20 threadedly directed therethrough, and wherein the leg member 20 is defined by a predetermined length, and wherein each threaded bore 19 is defined by a predetermined height equal to the predetermined length, wherein each leg member 20 is arranged for projection through the bottom wall 16 to permit spacing of the disc relative to the heating surface 11 to provide additional air gapping relative to an associated coffee pot container structure 12.

FIG. 9 illustrates the disc structure further including a plurality of diametrically opposed opening bores 21 directed through the central opening wall 22 of the central opening 14. A pair of lifting tongs 23 is provided, wherein the tongs includes "L" shaped legs 24, wherein the legs 24 include longitudinally aligned extension lugs 25 projecting exteriorly of the legs, wherein a single lug is received within a single leg to permit selective lifting of the disc for its repositioning without resorting to manual grasping and manipulation utilizing various inappropriate utensils.

The disc structure of FIG. 10 further includes a plurality of sensor switches 26, wherein a sensor switch 26 is positioned between adjacent internally threaded bores 19, as illustrated in FIG. 11, and includes a lower insulated fixed plate 27 arranged parallel to and spaced from the bottom wall 16 and the top wall 15, and includes an upper spaced movable plate 28 mounted in a spaced relationship relative to the underlying lower plate 27. A central electrical conductor plate 31 is mounted fixedly to the lower plate 27 and includes a respective first and second electrical spring contact 29 and 30 positioned on opposed sides of the plate 31 between the lower and upper movable plates 27 and 28. The first electrical spring contact 29 is in electrical communication with the first electrical contact wire 32, with the second electrical spring contact 30 in electrical communication with a second electrical contact wire 33 in operative communication with a battery 34 and an alarm 35 within an associated alarm housing 36. The contacts 29 and 30 are of a generally "U" shaped configuration and spaced from the conductor plate 31 in the absence of a coffee pot container mounted upon the top wall 15. When the coffee pot container with sufficient fluid, such as coffee, is positioned upon the plurality of sensor switches 26, the contacts 29 and 30 are depressed into communication with the central contact plate 31 to provide for a closed switch to prevent an audible or visual alarm to be emanated by the alarm housings 36. The alarm 35 may be an illumination bulb for visual observation or an audible alarm, or the combination thereof, to provide an appropriate alarm signal. When sufficient coffee is removed from the coffee pot subsequent to consumption thereof, and the contacts 29 and 30 have separated from the plate 31, this switch becomes open and the alarm will actuate.

It should be noted that any thermally conductive material is typically utilized, such as stainless steel, and the like, to provide for transmittal of heating to a bottom surface of the coffee pot container 12.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A coffee pot apparatus, comprising, a coffee pot container, and a heating surface, and a torroidal spacer disc, including a planar top wall spaced from and parallel to a planar bottom wall, with the planar top wall in contiguous communication with the coffee pot container, and the planar bottom wall in contiguous communication with the heating surface, and the spacer disc includes a cylindrical central opening defined by a central opening wall, and the spacer disc further includes a cylindrical side wall spaced from the central wall, wherein the central wall and the side wall are concentrically arranged relative to one another, and the spacer disc is defined by a disc diameter and the coffee pot container includes a bottom surface, wherein the bottom surface is defined by a predetermined coffee pot diameter, wherein the coffee pot diameter is greater than the disc diameter to effect projection of the bottom surface of the coffee pot beyond the spacer disc to provide for a first air gap between the coffee pot and the heating surface within the central opening, and a second air gap defined exteriorly of the spacer disc between the bottom surface of the coffee pot container and the heating surface, and the cylindrical side wall includes a temperature sensitive indicator strip fixedly mounted thereto for providing visual indication of available temperature directed to the spacer disc.

2. An apparatus as set forth in claim 1 including a plurality of internally threaded bores directed through the spacer disc orthogonally oriented to the planar top wall and the planar bottom wall, wherein the internally threaded bores are arranged in a circular array concentric relative to the spacer disc, and each internally threaded bore includes an externally threaded leg member, each internally threaded bore is defined by a predetermined height and each leg member is defined by a predetermined length, wherein the predetermined length is substantially equal to the predetermined height to permit selective projection of each leg member beyond the bottom wall permitting spacing of the bottom wall relative to the heating surface.

3. An apparatus as set forth in claim 2 wherein the central opening wall includes a plurality of diametrically opposed bores directed into the spacer disc, and a plurality of lifting tongs including a plurality of extension lugs, and each extension lug is arranged for projection within a respective opening bore to permit lifting of the spacer disc relative to the heating surface.

4. An apparatus as set forth in claim 3 wherein the spacer disc includes a plurality of sensor switches, and each sensor switch is arranged for projection through the top wall, and each sensor switch includes a lower insulated fix plate, and an upper spaced movable plate spaced from the lower plate for projection through the top wall, and the fix plate includes a central electrical conductor plate, and a first electrical spring contact and a second electrical spring contact mounted to the lower plate on opposed sides of the central plate biased in a spaced relationship relative to the central plate, wherein compression of the upper plate projects the first electrical spring contact and the second electrical spring contact in electrical communication with the central plate for effecting closure of the sensor switch, and each sensor switch in communication with an alarm housing, the alarm housing including an alarm contained therewithin, and the alarm arranged for actuation when the sensor switch is in a first raised position with the first electrical spring contact and the second electrical spring contact spaced from the central plate, and the alarm is in a deactivated mode when the first electrical contact and the second electrical contact are in communication with the central plate.

* * * * *